United States Patent [19]

Crescentini et al.

[11] 3,859,380

[45] Jan. 7, 1975

[54] ANTISTATIC POLYAMIDE FIBER

[75] Inventors: Lamberto Crescentini; Rodney Lee Wells, both of Chester, Va.

[73] Assignee: Allied Chemical Corporation, Morristown, N.J.

[22] Filed: Feb. 15, 1974

[21] Appl. No.: 443,048

Related U.S. Application Data

[62] Division of Ser. No. 273,246, July 19, 1972, abandoned.

[52] U.S. Cl. .................. 260/857 PG, 260/45.85 B, 260/45.85 P, 260/75 N, 260/77.5 AM, 260/77.5 AC, 260/78 SC, 260/830 P, 260/857 PE

[51] Int. Cl. .......................................... G08g 41/04

[58] Field of Search .......... 260/851 PG, 45.85 B, 260/45.85 P

[56] References Cited
UNITED STATES PATENTS

| | | | |
|---|---|---|---|
| 3,285,855 | 11/1966 | Dexter | 260/45.85 S |
| 3,330,859 | 7/1967 | Dexter | 260/45.85 B |
| 3,364,250 | 1/1968 | Dexter | 260/45.85 B |
| 3,594,448 | 7/1971 | Birenzvige | 260/45.85 B |
| 3,644,482 | 2/1972 | Dexter | 260/45.85 B |
| 3,657,386 | 4/1972 | Weedon | 260/857 PG |
| 3,723,489 | 3/1973 | Dexter | 260/45.85 B |
| 3,723,503 | 3/1973 | Dexter | 260/45.85 B |

*Primary Examiner*—Paul Lieberman
*Attorney, Agent, or Firm*—Fred L. Kelly

[57] ABSTRACT

It has been suggested that an antistatic fiber of polyamide can be prepared by uniformly dispersing in the polymer a small proportion of at least one compound having a molecular weight above 1500 selected from the group consisting of compounds represented by the formulas:

(A)

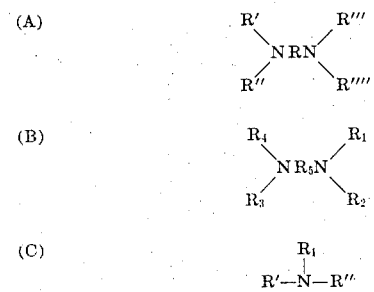

(B)

(C)

where R is at least one of the alkylene difunctional radicals having 3 to 15 carbon atoms and a radical selected from

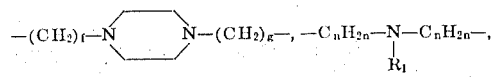

and $-(C_rH_{2r}O)_s-(C_uH_{2u}O)_t-C_wH_{2w}-$; where R', R'', R''' and R'''' are

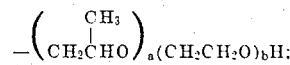

$R_1$, $R_2$, $R_3$ and $R_4$ are independently selected from R' and monovalent hydrocarbon radicals having 1 to 20 carbon atoms derived from aliphatic, aromatic, cycloaliphatic, aromatic-aliphatic, heterocyclic hydrocarbons or $-(C_rH_{2r}O)_m(C_pH_{2p}O)_q-H$; $R_5$ is ethylene radical, R or a divalent radical selected from:

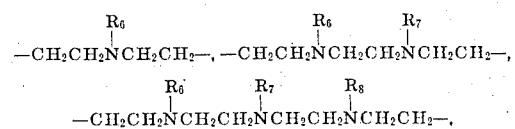

and

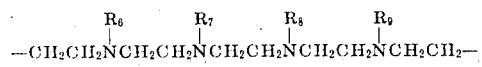

where $R_6$, $R_7$, $R_8$ and $R_9$ are independently selected from $R_1$, $R_2$, $R_3$, $R_4$ or another monovalent hydrocarbon radical having 1 to 20 carbon atoms as defined for $R_1$, $R_2$, $R_3$ and $R_4$,
provided that at least one of $R_1$, $R_2$, $R_3$, $R_4$, $R_5$, $R_6$, $R_7$, $R_8$ or $R_9$ is R';
where $n$ is 3 to 6, $r$ and $u$ are 2, 3, or 4; $m$, $q$ are 0 to 100; $m + q$ must be $>5$; $w$ is 2, 3, or 4; $p$ is 2 or 3; $f$, $g$, are 0 or 2 to 6; $s$ and $t$ are 0 or a whole number and $s + t$ must be less than 100; $a$ and $b$ are whole numbers;

D. the reaction product of A, B and/or C with at least one compound selected from
  i. diepoxides, and
  ii. compounds which yield the following divalent radicals

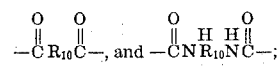

where $R_{10}$ is a divalent radical having 1 to 20 carbon atoms derived from aliphatic, aromatic, cycloaliphatic, aromaticaliphatic, or heterocyclic hydrocarbons.

However, with incorporation of this antistatic additive in the polyamide, serious problems have been encountered in melt-spinning due to the frequent occurrence of "nubs" or enlarged places in the extruded polyamide filament. It has now been found that the occurrence of said nubs in the antistatic polyamide fiber can be greatly reduced by dispersing in the polymer an additional small proportion of a hindered phenol represented by the formulas:

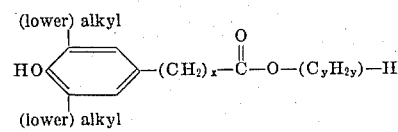

ative formula:
in which $x$ has a value of from 1 to 6 and $y$ has a value of from 6 to 30; and
in which A is
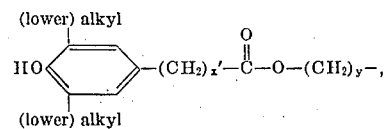
wherein $x'$ has a value from 1 to 6 and $y'$ has a value of 1 to 6.
10 Claims, No Drawings

ANTISTATIC POLYAMIDE FIBER

CROSS-REFERENCES TO RELATED APPLICATION

This is a division of application Ser. No. 273,246, filed July 19, 1972, now abandoned.

This invention is directed to an improvement upon the invention disclosed in U.S. application Ser. No. 193,567, filed Oct. 28, 1971. U.S. application Ser. No. 193,567 is hereby incorporated by reference into this application.

BACKGROUND OF THE INVENTION

This invention relates to a process for the meltspinning of a filamentary structure from a synthetic polyamide polymer. More particularly, it is concerned with an improved process for the formation of an improved antistatic filament, yarn or the like by melt-spinning a synthetic linear fiber-forming polyamide.

It has been suggested that the utility of synthetic fibers could be increased and their properties, in particular their antistatic properties, could be improved if a polyalkylene ether of high molecular weight is included in the polymer. More specifically, it is disclosed in U.S. Pat. No. 3,475,898 to Magat and Sharkey to use poly(ethylene-propylene)ether glycols for this purpose. More recently, U.S. Pat. No. 3,657,386 discloses that certain propylene oxide-ethylene oxide copolymers based on ethylene diamine are useful in preparation of an antistatic fiber of polyamide.

It has also been suggested in U.S. application Ser. No. 193,567 filed Oct. 28, 1971, that the utility of synthetic fiber of polyamide could be increased by dispersing in the polyamide an antistatic compound having a molecular weight above 1500 selected from the group consisting of compounds represented by the formulas:

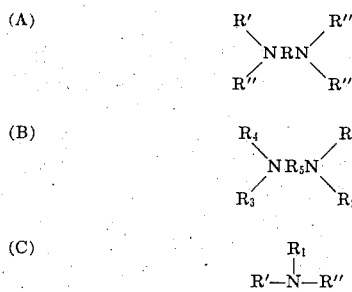

where R is at least one of the alkylene difunctional radicals having 3 to 15 carbon atoms and a radical selected from

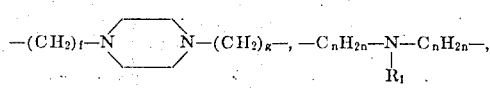

and $-(C_rH_{2r}O)_s-(C_uH_{2u}O)_t-C_wH_{2w}-$; where R′, R″, R‴ and R⁗ are

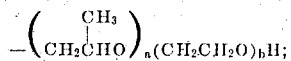

$R_1$, $R_2$, $R_3$ and $R_4$ are independently selected from R′ and monovalent hydrocarbon radicals having 1 to 20 carbon atoms derived from aliphatic, aromatic, cycloaliphatic, aromatic-aliphatic, heterocyclic hydrocarbons or $-(C_rH_{2r}O)_m(C_pH_{2p}O)_q-H$; $R_5$ is ethylene radical, R or a divalent radical selected from:

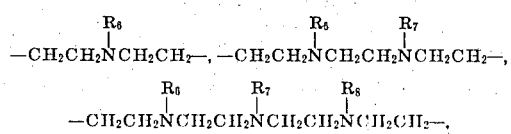

and

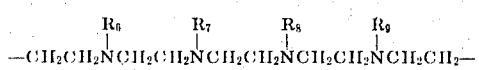

where $R_6$, $R_7$, $R_8$ and $R_9$ are independently selected from $R_1$, $R_2$, $R_3$, $R_4$ or another monovalent hydrocarbon radical having 1 to 20 carbon atoms as defined for $R_1$, $R_2$, $R_3$ and $R_4$ provided that at least one of $R_1$, $R_2$, $R_3$, $R_4$, $R_5$, $R_6$, $R_7$, $R_8$ or $R_9$ is R′;

where $n$ is 3 to 6, $r$ and $u$ are 2, 3, or 4; $m$, $q$ are 0 to 100; $m + q$ must be $>5$; w is 2, 3, or 4; $p$ is 2 or 3; $f$, $g$, are 0 or 2 to 6; s and $t$ are 0 or a whole number and $s + t$ must be less than 100; $a$ and $b$ are whole numbers;

D. the reaction product of A, B, and/or C with at least one compound selected from
  i. diepoxides, and
  ii. compounds which yield the following divalent radicals

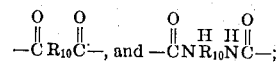

where $R_{10}$ is a divalent radical having 1 to 20 carbon atoms derived from aliphatic, aromatic, cycloaliphatic, aromatic-aliphatic, or heterocyclic hydrocarbons.

However, with use of this type of antistatic agent, serious problems were encountered in melt-spinning due to the frequent occurrence of "nubs" in the fiber. The term "nubs" is conventionally applied and is used herein to mean enlarged sections of filament no more than several filament diameters in length. Nubs may be formed by a foreign, non-orientable substance which interferes with normal fiber stretch in a short section, resulting in an enlargement. Foreign substances which are believed to have contributed to nubs in the present instance include carbonized polymer from face of extruder die and spinnerette, and gels formed in the polymer. Gels appear to be the chief cause, i.e., the nubs are probably created by nonorientable gel from crosslinked polymer. Thermal degradation of the polymer may be an important causative factor.

The reactions in thermal degradation of polyamides containing polyalkylene ether additives are not entirely understood. It is likely that thermal degradation produces a decomposition product which serves to form cross-links between amide groups and adjacent polymer chains. The decomposition reaction proceeds slowly, finally building up a three-dimensional network of molecules which may be called polymer gel and which eventually reaches the stage where it forms an infusible coating on the walls of the reactor and other equipment.

A serious difficulty which arises from the formation of this polymer gel on the interior walls is that from time to time pieces break off and get into the flowing polymer stream where they produce damage to the spinning equipment.

The greatest difficulty, however, is caused by polymer gel which has progressed to the three-dimensional structural stage, but which has not yet reached the stage of being infusible. This kind of polymer gel is readily carried with the stream of flowing polymer. Being still molten or at least softened, it passes through the pump and even through the filter medium to show up either as discontinuities or as viscosity differences in the spun filament. When these filaments are later cold drawn, these defects may cause breaks in the filaments which either cause the whole thread to break or else form nubs which go through to be counted as quality defects in the final yarns.

SUMMARY OF THE INVENTION

It is an object of this invention to avoid the above difficulties by minimizing gel formations in the molten polyamide. Another object is to avoid accumulation of polymer gel on the walls of the reactor, in the pump, or in the filtering medium when melt-spinning the polyamide. A further object is to improve the uniformity and quality of filaments or fibers formed from the molten polymer, in particular to minimize nub formation in the filaments. Other objects will become apparent from the disclosure and the appended claims.

These objects are accomplished by the present invention which provides an improvement in the process for the formation of an antistatic polyamide fiber from a fiberforming polyamide polymer containing from about 1 to about 12 percent, preferably about 2 to about 10 percent by weight of at least one compound having a molecular weight above 1500 selected from the group consisting of compounds represented by the formulas:

(A)

$$\begin{matrix} R' & & R''' \\ & \diagdown N R N \diagup & \\ R'' & & R'''' \end{matrix}$$

(B)

$$\begin{matrix} R_4 & & R_1 \\ & \diagdown N R_5 N \diagup & \\ R_3 & & R_2 \end{matrix}$$

(C)

$$R'{-}\underset{\underset{R_1}{|}}{N}{-}R''$$

where R is at least one of the alkylene difunctional radicals having 3 to 15 carbon atoms and a radical selected from

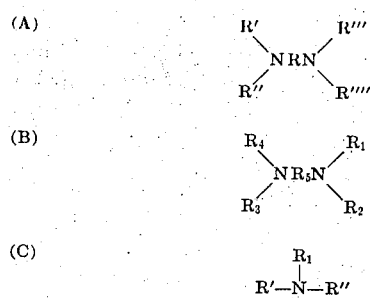

and $-(C_rH_{2r}O)_s-(C_uH_{2u}O)_t-C_wH_{2w}-$; where R', R'', R''' and R'''' are

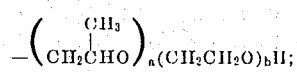

where $R_1$, $R_2$, $R_3$ and $R_4$ are independently selected from R' and monovalent hydrocarbon radicals having 1 to 20 carbon atoms derived from aliphatic, aromatic, cycloaliphatic, aromatic-aliphatic, heterocyclic hydrocarbons or $-(C_rH_{2r}O)_m(C_pH_{2p}O)_q-H$; where $R_5$ is ethylene radical, R or a divalent radical selected from:

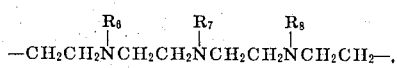

and

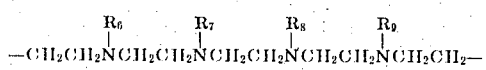

and $R_6$, $R_7$, $R_8$ and $R_9$ are independently selected from $R_1$, $R_2$, $R_3$, $R_4$ or another monovalent hydrocarbon radical having 1 to 20 carbon atoms as defined for $R_1$, $R_2$, $R_3$ and $R_4$, provided that at least one of $R_1$, $R_2$, $R_3$, $R_4$, $R_5$, $R_6$, $R_7$, $R_8$ or $R_9$ is R';

where n is 3 to 6, r and u are 2, 3, or 4; m, q are 0 to 100; m + q must be >5; w is 2, 3, or 4; p is 2 or 3; f, g, are 0 or 2 to 6; s and t are 0 or a whole number and s + t must be less than 100; a and b are whole numbers;

D. the reaction product of A, B and/or C with at least one compound selected from
i. diepoxides, and
ii. compounds which yield the following divalent radicals

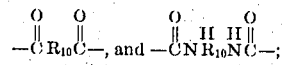

where $R_{10}$ is a divalent radical having 1 to 20 carbon atoms derived from aliphatic, aromatic, cycloaliphatic, aromatic-aliphatic, or heterocyclic hydrocarbons, by extruding the molten polymer through an orifice into a quenching medium and thereafter stretching the resulting filaments, the improvement comprising dissolving in the extrudate prior to extrusion at least 0.1 percent by weight, preferably 0.5 to 8 percent, based on the weight of the antistatic compound, of a phenol of the formulas:

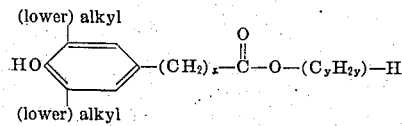

in which x has a value of from 1 to 6 and y has a value of from 6 to 30; and

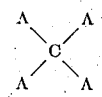

in which A is

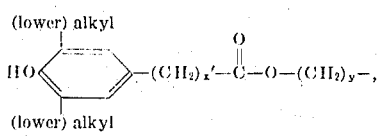

where $x'$ has a value from 1 to 6 and $y'$ has a value of 1 to 6.

When the term "alkyl" is qualified by the designation "(lower)," there is intended a branched or straight chain hydrocarbon of from 1 to about 6 carbon atoms.

Preferably, the phenol compound is used with at least 0.1 percent by weight, based on the weight of the antistatic additive, of a sulfur compound of the formula:

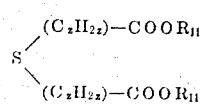

where $R_{11}$ is an alkyl radical containing 8 to 18 carbon atoms and $z$ is 1 to 3.

As stated above, the present invention is an improvement upon the invention disclosed in U.S. application Ser. No. 193,567 which relates to an antistatic fiber containing an antistatic compound selected from the compounds labelled A to D above. These antistatic compounds are either commercially available or easily prepared from commercially available compounds by one skilled in the art. The method of preparing the antistatic additive D above, the chain-extended compounds, is fully taught in U.S. application Ser. No. 239,905 filed Mar. 31, 1972.

Typical polyalkylenepolyamines and monoamines upon which the compounds above are based are given in the following examples.

The polyepoxy coupled compounds can be prepared by the method taught in British 793,915, Example I. The other classes of compounds can be similarly prepared, as in Example 10 in U.S. Pat. No. 3,009,884.

Typical of the acids and their esters to provide the chain extending difunctional radical are the dialkyl phthalic, isophthalic or terephthalic esters, such as dimethyl terephthalate and adipic, phthalic, terephthalic, sebacic, glutaric, pimelic, isocinchomeronic acids and their esters.

Typical of the polyepoxy compounds which provide the difunctional or divalent compounds, used to chain extend the compounds A, B and/or C, are those polyepoxy compounds described in British specification 793,915 to Union Carbide on page 2, line 48 to line 121.

Also useful to form chain-extending divalent radicals are the aromatic or aliphatic diisocyanates.

The alkylated phenol compounds useful in the present invention are known compounds and some are commercially available. The alkylation of phenols is readily conducted with a variety of catalysts and alkylating agents; see Price, *Organic Reactions* III, 58 (1946). The preparation of 2,6-dialkylphenols by direct alkylation is relatively difficult but a procedure is furnished in *Journal of Organic Chemistry*, 21, 712 (1956). Pertinent patents include U.S. Pat. No. 3,285,855 and U.S. Pat. No. 3,330,859. The sulfur compounds of the invention may be prepared in accordance with *Chemical Abstracts*, 64, 3362C. U.S. Pat. No. 2,762,836 is also pertinent.

The antistatic fiber of this invention may also contain conventional fiber additives such as antioxidants, stabilizers, delusterants, dyeing assists, and colorants.

DESCRIPTION OF THE PREFERRED EMBODIMENTS

The invention will now be further described in the following specific examples which are to be regarded solely as illustrative and not as restricting the scope of the invention.

EXAMPLE 1

The antistatic additive used in this example was obtained by the reaction of triethylene tetramine with propylene oxide (PO) then ethylene oxide (EO) to form an EO/PO block copolymer containing 70 percent EO in the molecule. The additive is soluble in water and toluene and has a molecular weight of 34,000 and a melt viscosity of 1,750 centipoises at 100°C. measured with the Brookfield viscometer.

A glass reactor equipped with a heater and stirrer was charged with a mixture of 1,520 grams of e-caprolactam and 80 grams of aminocaproic acid. The mixture was then flushed with nitrogen and was stirred and heated to 255°C. over a 1 hour period at atmospheric pressure to produce a polymerization reaction. The heating and stirring was continued at atmospheric pressure under a nitrogen sweep for an additional 4 hours in order to complete the polymerization. During the last 30 minutes of the polymerization, 1.8 gram of tetra[methylene 3-(3',5'-ditertiary-butyl-4'-hydroxyphenyl)propionate]methane and 60 grams of the antistatic additive were added to the polycaproamide and stirring was continued to thoroughly mix the additives throughout the polymer. The tetra[methylene 3-(3',5'-di-tertiary-butyl-4'-hydroxyphenyl)propionate] methane is sold commercially under the tradename Irganox 1010 and has the formula:

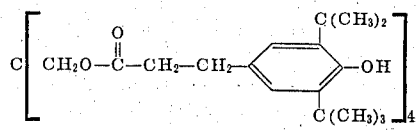

Nitrogen was then admitted to the glass reactor and a small pressure was maintained while the polymer was extruded from the glass reactor in the form of a polymer ribbon. The polymer ribbon was subsequently cooled, pelletized, washed and then dried. The polymer was a white solid having a relative viscosity of about 55 to 60 as determined by a concentration of 11 grams of polymer in 100 milliliters of 90 percent formic acid at 25°C. (ASTMD789–62T).

The polycaproamide pellets containing the antistatic additives and the phenol additive were melted at about 285°C. and then melt-extruded under a pressure of about 1,500 psig through a 16-orifice spinnerette, each of the orifices having a diameter of 0.014 inch, to produce a 250-denier fiber. The fiber was then collected at about 1,000 feet per minute and was drawn about 3.5 times its extruded length to produce a 70-denier yarn. For convenience, this yarn hereinafter will be called Yarn A. A control yarn containing the antistatic agent but no additional additive was produced in the same manner as described above. For convenience, this yarn hereinafter will be called Yarn B.

Yarn A and Yarn B were woven into conventional plain weave fabrics. The fabrics were cut into fabric test samples having a width of 3 inches and a length of 9 inches. The fabric samples were tested for their antistatic property in accordance with the general procedure described in the *Technical Manual of the American Association of Textile Chemists and Colorists*, 1969 edition, Volume 45, at pages 206–207. This test procedure is entitled "Electrostatic Clinging of Fabrics: Fabric to Metal Test" and is numbered AATCC 115–1969. In accordance with this test, Yarn A and Yarn B both showed excellent antistatic properties, for example, average time for fabric samples to decling from metal completely on their own was about 60 seconds after 25 wash cycles. Yarn A and Yarn B were also tested for the number of nubs per pound as shown in Example 2.

EXAMPLE 2

This example outlines the method used for locating, identifying and calculating the nubs per pound on Yarn A and Yarn B as prepared in Example 1. In this method a nub is defined as an enlarged place in a filament which is no more than several filament diameters in length. This method may be used for either monofilament or multifilament yarns; however, it is not applicable to most types of crimped yarn.

In accordance with the test, the 70-denier yarn is drawn directly from the package by means of an air aspirator and is passed through an opening of known width, specifically, 0.0030 inch in width. Such an opening is conveniently provided by use of a ceramic cleaner gap, which is well-known in the art. The presence of a nub is detected when it stops the yarn passage through the opening. The filaments are separated and the cause of the yarn stopping identified as a nub or as the twisted end of a broken filament. For representative results, about 75 grams of yarn is passsed through the gap and the number of nubs counted. Table I below shows the results of testing on Yarn A and Yarn B.

TABLE I

Determination of Nubs Per Pound

| Yarn Sample | Nub Count Per Pound of Yarn |
|---|---|
| Yarn A | $1.5 \times 10^3$ |
| Yarn B | $16.0 \times 10^3$ |

It will be noted that the addition of the antistatic compound to the polyamide resulted in a nub count of $16.0 \times 10^3$ per pound of yarn, which is much higher than ordinary polyamide fiber. However, the addition of the antistatic compound plus the phenol compound reduced the nub count to $1.5 \times 10^3$ nubs per pound of yarn.

EXAMPLE 3

The procedure of Example 1 (Yarn A) was followed using 1.8 gram of tetra[methylene-3-(3',5'-di-tertiary butyl-4'-hydroxyphenyl)propionate]methane and 60 grams of a chainextended antistatic additive. This antistatic additive is one obtained by reaction of the polyether antistatic additive of Example 1 with the compound 4,4'-methylene bis (cyclohexyl) isocyanate in a polyether:isocyanate mol ratio of 1:0.9. This product is soluble in water and toluene, is fusible and has a melt viscosity of 4100 centipoises at 100°C.

The fiber produced showed excellent antistatic properties, i.e., the average time for fabric to decling from metal was 50 seconds after 25 wash cycles according to the above-described AATCC test. The fiber produced was pale yellow and had a nub count of $1.5 \times 10^3$ nubs per pound of yarn.

EXAMPLE 4

A glasss reactor equipped with a heater and stirrer was charged with a mixture of 1,520 grams of e-caprolactam and 80 grams of aminocaproic acid. The mixture was then flushed with nitrogen and was stirred and heated to 255°C. over a 1 hour period at atmospheric pressure to produce a polymerization reaction. The heating and stirring was continued at atmospheric pressure under a nitrogen sweep for an additional four hours in order to complete the polymerization.

Nitrogen was then admitted to the reactor and a small pressure was maintained while the polymer was extruded from the reactor in the form of a polymer ribbon. At this time 60 grams of the antistatic additive described in Example 3 and 1.8 gram of tetra[methylene 3-(3',5'-di-tertiary-butyl-4'-hydroxyphenyl)propionate]methane was mixed into the polymer by blending molten polymer and the additives in a static mixer to produce a uniform dispersion of both additives in the extrudate.

The polymer ribbon was subsequently cooled, pelletized using a Wiley Mill, washed and then dried. The polymer was a white solid having a relative viscosity of about 55 to 60, as determined at a concentration of 11 grams of polymer in 100 ml. of 90 percent formic acid at 25°C. (ASTMD–789–62T).

The polycaproamide pellets containing the additives were melted at about 285°C. and then melt extruded under a pressure of 1,500 psig through a 16-orifice spinnerette, each of the orifices having a diameter of 0.014 inch, to produce a 250-denier fiber. The fiber was collected at about 1,000 feet per minute and was drawn about 3.5 times its extruded length to produce a 70-denier yarn with a ½-Z twist.

The fibers were then processed as in Example 1. Average time for fabric samples to decling from metal was 62 seconds after 25 wash cycles, according to the above-described AATCC test. The fiber produced had a nub count of $1.8 \times 10^3$ nubs per pound.

EXAMPLE 5

The procedure of Example 4 was followed except that 90 grams of the antistatic additive was used together with 2.7 grams of tetra[methylene 3-(3',5'-di-tertiary butyl4'-hydroxyphenyl)propionate]methane. The fiber produced was pale yellow and had a nub count of $1.5 \times 10^3$ nubs per pound of yarn. Average time for fabric samples to decling from metal was 52 seconds after 25 wash cycles.

EXAMPLE 6

The procedure of Example 4 was followed except that 90 grams of the antistatic compound of Example 3 was added to the polycaproamide together with 2.7 grams of octadecyl-3-(3',5'-di-tertiary butyl-4'-hydroxyphenyl) propionate. The fiber produced was pale yellow and had a nub count of $1.0 \times 10^3$ nubs per pound of yarn. The octadecyl-3-(3',5'-di-tertiary butyl- 4'-hydroxyphenyl) propionate is sold commercially under the trade name Irganox 1076 and has the formula:

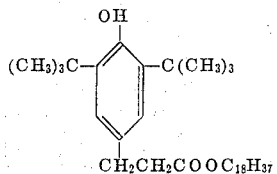

EXAMPLE 7

The procedure of Example 4 was followed except that 90 grams of the antistatic additive of Example 3 was used together with 1.35 grams of tetra[methylene 3-(3',5'-di-tertiary-butyl-4'-hydroxyphenyl)propionate]methane and 1.35 grams of distearyl thiodipropionate.

The fiber produced was pale yellow and had a nub count of $1.5 \times 10^3$ nubs per pound of yarn.

EXAMPLE 8

The procedure of Example 1 (Yarn A) was followed except that the antistatic additive was obtained by reaction of the polyether additive described in Example 1 with dimethyl terephthalate (DMT) in a polyether:DMT mol ratio of 1:0.9. The resulting additive was a fusible solid having a melt viscosity of 4,000 centipoises at 100°C. About 90 grams of this antistatic additive was added with 2.7 grams of tetra[methylene 3-(3',5'-di-tertiary-butyl-4'-hydroxyphenyl)propionate]methane.

The fiber produced was pale yellow and had a nub count of $1.5 \times 10^3$ nubs per pound of yarn. Average time for fabric samples to decling from metal was 46 seconds after 25 wash cycles.

EXAMPLE 9

The procedure of Example 1 was used except that the antistatic additive was obtained by reaction of the polyether of Example 1 and diglycidyl ether of 2,2-bis(4-hydroxyphenyl)propane in a mol ratio of polyether:epoxy compound of 1:0.9. About 90 grams of this antistatic additive was added with 2.7 grams of tetra[methylene 3-(3',5'-di-tertiary-butyl-4'-hydroxyphenyl)propionate]methane.

The fiber was pale yellow and had a nub count of $1.6 \times 10^3$ nubs per pound of yarn. A control yarn containing only the antistatic additive had a nub count of $5.5 \times 10^3$ nubs per pound of yarn.

EXAMPLE 10

The procedure was that of Example 1 except that a different antistatic additive was used. The antistatic additive is based on diethylene triamine which was propoxylated then ethoxylated to give a EO/PO block copolymer containing 40% ethylene oxide in the molecule. The additive is a fusible solid, soluble in water, alcohol and toluene and had a molecular weight of 16,000. To the polymer, 60 grams of this antistatic additive was added together with 1.8 grams of tetra[methylene 3-(3',5'-di-tertiary-butyl-4'-hydroxyphenyl)propionate]methane.

The fiber was pale yellow and had a nub count of $1.9 \times 10^3$ nubs per pound of yarn. Average time for fabric samples to decling from metal was 58 seconds after 25 wash cycles.

EXAMPLE 11

The procedure of Example 4 was followed except that the antistatic additive was product obtained by reaction of the polyether of Example 10 and dimethyl terephthalate (DMT) in a polyether:DMT mol ratio of 1:0.9. The antistatic additive obtained was fusible and soluble in water and toluene. To the polymer, 90 grams of this antistatic additive and 2.7 grams of tetra[methylene 3-(3',5'-di-tertiary-butyl-4'-hydroxyphenyl)propionate]methane were added.

The fiber produced was pale yellow and had a nub count of $1.8 \times 10^3$ nubs per pound. Average time for fabric samples to decling from metal was 85 seconds after 25 wash cycles.

EXAMPLE 12

Procedure was that of Example 4 with antistatic additive similar to that in Example 10 except the EO/PO block copolymer type polyether was based on tetraethylene pentamine and contained 40% ethylene oxide. It is a fusible solid, soluble in water or toluene having a molecular weight 22,000. Ninety grams of antistatic additive was used together with 2.7 grams of tetra[methylene 3-(3',5'-di-tertiary-butyl-4'-hydroxyphenyl)propionate]methane.

The fiber was pale yellow and had a nub count of $1.9 \times 10^3$ nubs per pound of yarn. Average time for fabric samples to decling from metal was 75 seconds after 25 wash cycles.

EXAMPLE 13

Procedure was that of Example 4. The antistatic additive was the polyether of Example 12 chain-extended with dimethyl terephthalate (DMT) at a 1:0.9 mol ratio polyether to DMT. About 60 grams of this antistatic additive and 1.8 gram of tetra[methylene 3-(3',5'-di-tertiary-butyl-4'-hydroxyphenyl)propionate]methane were added to the polymer.

The fiber was pale yellow and had a nub count of $1.5 \times 10^3$ nubs per pound of yarn. A control yarn containing only the antistatic additive had a nub count of $5.4 \times 10^3$ nubs per pound of yarn.

EXAMPLE 14

Procedure was that of Example 4, with a different antistatic additive which is a EO/PO block copolymer type polyether based on pentaethylenehexamine and contains 40% ethylene oxide in the molecule. The antistatic additive was a fusible material with a molecular weight of 25,000. Ninety grams of this additive were used with 2.7 grams of tetra[methylene 3-(3',5'-di-tertiary-butyl-4'-hydroxyphenyl)propionate]methane.

The fiber was pale yellow and had a nub count of $1.8 \times 10^3$ nubs per pound of yarn. Average time for fabric samples to decling from metal was 115 seconds after 25 wash cycles.

EXAMPLE 15

Procedure was that of Example 4 except that the antistatic additive was the polyether of Example 14 chain-extended with dimethyl terephthalate (DMT) at a 1:0.9 polyether:DMT mol ratio. The antistatic additive was a fusible solid. Ninety grams of this additive and 2.7 grams of tetra[methylene 3-(3',5'-di-tertiary-butyl-4'-hydroxyphenyl)propionate]methane were added to the polymer.

The fiber was pale yellow and had a nub count of 1.5 × 10³ nubs per pound of yarn. Average time for fabric samples to decling from metal was 79 seconds after 25 wash cycles.

EXAMPLE 16

Procedure was that of Example 4 except that the antistatic additive was an EO/PO block copolymer with 40% EO in the molecule, based on methyliminobispropylamine. This fusible antistatic material had a molecular weight of 13,000. Ninety grams of this antistatic additive was used with 2.7 grams of tetra[methylene 3-(3',5'-di-tertiary-butyl-4'-hydroxyphenyl)propionate]methane.

The fiber was pale yellow and had a nub ocunt of 1.8 × 10³ nubs per pound of yarn. Average time for fabric samples to decling from metal was 97 seconds after 25 wash cycles.

EXAMPLE 17

Procedure was that of Example 4 except that the antistatic additive was an EO/PO block copolymer of stearylamine with 40% EO in the molecule and a molecular weight of 7,000. Ninety grams of this antistatic additive was used with 2.7 grams of tetra[methylene 3-(3',5'-di-tertiary-butyl-4'-hydroxyphenyl)propionate]methane.

The fiber was pale yellow and had a nub count of 2.1 × 10³ nubs per pound of yarn. Average time for fabric samples to decling from metal was 85 seconds after 25 wash cycles.

EXAMPLE 18

Procedure was that of Example 4 except that the antistatic additive was an EO/PO block copolymer based on N-stearyl 1,3-propane-diamine containing 40% ethylene oxide in the molecule and having a molecular weight of 10,000. Ninety grams of this antistatic additive was used with 2.7 grams of tetra[methylene 3-(3',5'-di-tertiary-butyl-4'-hydroxyphenyl)propionate]methane.

The fiber was pale yellow and had a nub count of 2.1 × 10³ nubs per pound of yarn. Average time for fabric samples to decling from metal was 110 seconds after 25 wash cycles.

EXAMPLE 19

Procedure was that of Example 4 except that the antistatic additive was an EO/PO block copolymer based on 1,4-diamino piperazine containing 40% EO in the molecule and having a molecular weight of 13,000. Ninety grams of this antistatic additive was used with 2.7 grams of tetra[methylene 3-(3',5'-di-tertiary-butyl-4'-hydroxyphenyl)propionate]methane.

The fiber was pale yellow and had a nub count of 2.1 × 10³ nubs per pound of yarn. Average time for fabric samples to decling from metal was 67 seconds after 25 wash cycles.

EXAMPLE 20

Procedure was that of Example 4 except that the antistatic additive was an EO/PO block copolymer based on 1,4-dimethyl diethylenetriamine, containing 40% EO in the molecule. Ninety grams of this antistatic additive was used with 2.7 grams of tetra[methylene 3-(3',5'-di-tertiary-butyl-4'-hydroxyphenyl)propionate]methane.

The fiber was pale yellow and had a nub count of 2.0 × 10³ nubs per pound of yarn. Average time for fabric samples to decling from metal was 64 seconds after 25 wash cycles.

EXAMPLE 21

Procedure was that of Example 4 except that the antistatic additive was an EO/PO block copolymer based on polyoxypropylenediamine of molecular weight 230, containing 40% EO in the molecule. Ninety grams of this antistatic additive was used with 2.7 grams of tetra[methylene 3-(3',5'-di-tertiary-butyl-4'-hydroxyphenyl)propionate]methane.

The fiber was pale yellow and had a nub count of 1.9 × 10³ nubs per pound of yarn. Average time for fabric samples to decling from metal was 67 seconds after 25 wash cycles.

EXAMPLE 22

Procedure is that of Example 4 except that the antistatic additive was an EO/PO block copolymer based on N,N'-bis(3-aminopropyl)piperazine. The additive contained 40% EO in the molecule. Ninety grams of this antistatic additive was used with 2.7 grams of tetra[methylene 3-(3',5'-di-tertiary-butyl-4'-hydroxyphenyl)propionate]methane.

The fiber was pale yellow and had a nub count of 2.0 × 10³ nubs per pound of yarn. Average time for fabric samples to decling from metal was 86 seconds after 25 wash cycles.

EXAMPLE 23

The procedure of Example 1 (Yarn A) was followed except that 90 grams of the antistatic additive of Example 3 was used together with 2.7 grams of tetra[methylene 3-(3',5'-di-tertiary-butyl-4'-hydroxyphenyl)propionate]methane. The fiber produced was pale yellow and had a nub count of 1.5 × 10³ nubs per pound of yarn. A control yarn containing only the antistatic additive of Example 3 was produced and had a nub count of 5.3 × 10³ nubs per pound of yarn.

EXAMPLE 24

The procedure of Example 1 (Yarn A) was followed except that 90 grams of the antistatic additive of Example 3 was used together with 2.7 grams of octadecyl-3-(3',5'-di-tertiary butyl-4'-hydroxyphenyl)propionate. The fiber produced was pale yellow and had a nub count of 0.9 × 10³ nubs per pound of yarn.

EXAMPLE 25

The procedure of Example 1 (Yarn A) was followed except that 90 grams of the antistatic additive of Example 3 was used together with 1.35 grams of tetra[methylene 3-(3',5'-di-tertiary-butyl-4'-hydroxyphenyl)propionate]methane and 1.35 grams of distearyl thiodipropionate. The fiber produced was pale yellow and had a nub count of 1.4 × 10³ nubs per pound of yarn.

EXAMPLE 26

The procedure of Example 1 (Yarn A) was followed except that the additives were charged with the caprolactam initially. The antistatic fiber produced was a pale yellow and the nub count was 1.5 × 10³ per pound of yarn.

EXAMPLE 27

The procedure of Example 1 (Yarn A) was followed except that the antistatic additive was charged with the caprolactam but no phenol compound was added. The antistatic fiber produced was a deep yellow and had a high nub count of $16.0 \times 10^3$ nubs per pound of yarn.

EXAMPLE 28

The procedure of Example 1 (Yarn A) was followed except that 90 gram of the antistatic additive of Example 1 was used together with 1.35 grams of tetra[methylene 3-(3',5'-di-tertiary-butyl-4'-hydroxyphenyl)propionate]methane and 1.35 grams of dilaurylthiodipropionate. The fiber produced was pale yellow and had a nub count of $1.8 \times 10^3$ nubs per pound of yarn.

EXAMPLE 29

The procedure of Example 1 (Yarn A) was followed except that 90 grams of the antistatic additive of Example 1 was used together with 2.7 grams of tetra[methylene 3-(3',5'-di-isopropyl 4'-hydroxyphenyl)propionate]methane. The fiber produced was pale yellow and had a nub count of $1.8 \times 10^3$ nubs per pound of yarn.

EXAMPLE 30

The procedure of Example 1 (Yarn A) was followed except that 90 grams of the antistatic additive of Example 1 was used together with 2.7 grams of octadecyl-3-(3',5'-di-isopropyl-4'-hydroryphenyl)propionate. The fiber produced was pale yellow and had a nub count of $1.4 \times 10^3$ nubs per pound of yarn.

EXAMPLE 31

The procedure of Example 1 (Yarn A) was followed except that 90 grams of the antistatic additive of Example 1 was used together with 0.9 gram of tetra[methylene 3-(3',5'-di-tertiary-butyl-4'-hydroxyphenyl)propionate]methane. The fiber produced was pale yellow and had a nub count of $1.9 \times 10^3$ nubs per pound of yarn.

EXAMPLE 32

The procedure of Example 1 (Yarn A) was followed except that 90 grams of the antistatic additive of Example 1 was used together with 1.8 grams of tetra[methylene 3-(3',5'-di-tertiary-butyl-4'-hydroxyphenyl)propionate]methane. The fiber produced was pale yellow and had a nub count of $1.7 \times 10^3$ nubs per pound of yarn.

EXAMPLE 33

The procedure of Example 1 (Yarn A) was followed except that 90 grams of the antistatic additive of Example 1 was used together with 3.6 grams of tetra[methylene 3-(3',5'-di-tertiary-butyl-4'-hydroxyphenyl)propionate]methane. The fiber produced was pale yellow and had a nub count of $1.3 \times 10^3$ nubs per pound of yarn.

EXAMPLE 34

The procedure of Example 1 (Yarn A) was followed except that 90 grams of the antistatic additive of Example 1 was used together with 4.5 grams of tetra[methylene 3-(3',5'-di-tertiary-butyl-4'-hydroxyphenyl)propionate]methane. The fiber produced was pale yellow and had a nub count of $1.3 \times 10^3$ nubs per pound of yarn.

EXAMPLE 35

The procedure of Example 1 (Yarn A) was followed except that 44 grams of the antistatic additive of Example 1 was used together with 1.32 grams of tetra[methylene 3-(3',5'-di-tertiary-butyl-4'-hydroxyphenyl)propionate]methane. The fiber produced was pale yellow and had a nub count of $1.1 \times 10^3$ nubs per pound of yarn.

EXAMPLE 36

The procedure of Example 1 (Yarn A) was followed except that 30 grams of the antistatic additive of Example 1 was used together with 0.9 gram of tetra[methylene 3-(3',5'-di-tertiary-butyl-4'-hydroxyphenyl)propionate]methane. The fiber produced was pale yellow and had a nub count of $0.8 \times 10^3$ nubs per pound of yarn.

EXAMPLE 37

Polycaproamide pellets containing the antistatic agent of Example 1 and tetra[methylene 3-(3',5'-di-tertiary-butyl-4'-hydroxyphenyl)propionate]methane was prepared in accordance with the procedure of Example 1. The polycaproamide pellets were melted at about 285°C. and then melt extruded under pressure of 15 psig to a 70-orifice spinnerette, each of the orifices having a diameter of 0.018 inch to produce a 4,500 denier fiber. The fiber was collected at 1,000 feet per minute and was drawn about 4 times the extruded length to produce 1,125 denier yarn.

The yarn was textured using a steam jet and two-plied. Then, the yarn was tufted into a level loop carpet at 6.5 stitch rate, 9-10/32 inch pile height, mock dyed and latexed. Static buildup of the carpet was tested by a "shuffle test" measuring the electrostatic voltage build-up on a person walking with a series of short shuffling steps on a piece of carpet conditioned at 70°F. at 20% relative humidity. The voltage generated was 4.8 KV.

The untextured yarn was also tested for nubs using the nub count procedure of Example 2 except that the ceramic cleaner gap used had an opening of 0.006 inch. The nub count of the yarn was 100 nubs per pound.

EXAMPLE 38

The procedure and additives utilized in this example were similar to Example 1 (Yarn A) except that the polyamide was polymerized from poly(hexamethylene ammonium)adipate salt. A fiber was produced and nubs were counted as in Example 2; the result was $1.5 \times 10^3$ nubs per pound of yarn.

DISCUSSION

In additional tests, it was determined that the molecular weight of the antistatic compound is preferably above about 4,000, the ethylene oxide moieties making up about 20 to about 80% of the molecular weight of said compound. Preferably, the antistatic fiber contains from about 2 to about 8% of the antistatic compound.

By "antistatic" fiber is meant fibers that will pass the cling test and the shuffle test as described in U.S. Pat. No. 3,657,386. By "fiber" is meant multifilament yarn, monofilament, and all the known physical forms of synthetic fibers. By "polyamide" is meant the polymers made by condensation of diamines with dibasic acids or by polymerization of lactams or amino acids, resulting in a synthetic resin characterized by the recurring group —CONH—. By "ethylene oxide moiety" is meant the portion of the chemical molecule —($CH_2CH_2O$)—.

Desirably, the antistatic compound and the other additives are substantially uniformly dispersed in the polyamide. Preferably, the weight ratio of the phenol compound to sulfur compound is between 0.25 and 4.0.

We claim:

1. In a process for the formation of an antistatic polyamide fiber from a fiber-forming polymer containing about 1 percent to 12 percent by weight of an antistatic compound having a molecular weight above 1,500, said antistatic compound being the reaction product of a compound selected from the group consisting of compounds represented by the formulae:

(A) 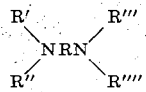

(B) 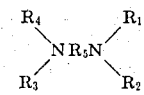

(C) 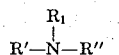

where
R is at least one of the alkylene difunctional radicals having 3 to 15 carbon atoms and a radical selected from

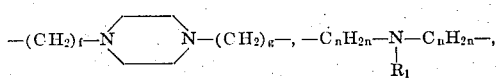

and
—$(C_rH_{2r}O)_s$—$(C_uH_{2u}O)_t$—$C_wH_{2w}$—;
where R', R'', R''' and R'''' are

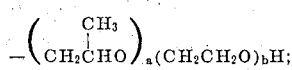

where $R_1$, $R_2$, $R_3$ and $R_4$ are independently selected from R' and monovalent hydrocarbon radicals having 1 to 20 carbon atoms derived from aliphatic, aromatic, cycloaliphatic, aromatic-aliphatic, heterocyclic hydrocarbons or —$(C_rH_{2r}O)_m(C_pH_{2p}O)_q$—H;
where $R_5$ is ethylene radical, R or a divalent radical selected from:

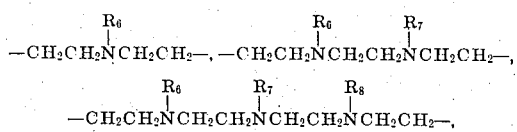

and

and
$R_6$, $R_7$, $R_8$ and $R_9$ are independently selected from $R_1$, $R_2$, $R_3$, $R_4$ or another monovalent hydrocarbon radical having 1 to 20 carbon atoms as defined for $R_1$, $R_2$, $R_3$ and $R_4$,
provided that at least one of $R_1$, $R_2$, $R_3$, $R_4$, $R_5$, $R_6$, $R_7$, $R_8$ or $R_9$ is R';
where $n$ is 3 to 6, $r$ and $u$ are 2, 3, or 4; $m$, $q$ are 0 to 100; $m + q$ must be >5, w is 2, 3, or 4; $p$ is 2 or 3; $f$, $g$, are 0 or 2 to 6; $s$ and $t$ are 0 or a whole number and $s + t$ must be less than 100; $a$ and $b$ are whole numbers; with at least one compound selected from compounds which yield the following divalent radical

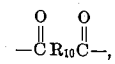

where
$R_{10}$ is a divalent radical having 1 to 20 carbon atoms derived from aliphatic, aromatic, cycloaliphatic, aromatic-aliphatic, or heterocyclic hydrocarbons, by extruding the molten polymer through an orifice into a quenching medium and thereafter stretching the resulting filaments, the improvements comprising dissolving in the extrudate prior to extrusion at least 0.1 percent by weight, based on the weight of the antistatic compound, of a phenol compound selected from the group consisting of:

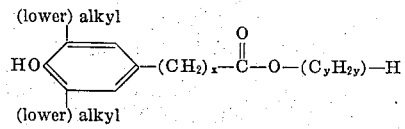

in which $x$ has a value of from 1 to 6 and $y$ has a value of from 6 to 30; and

in which A is

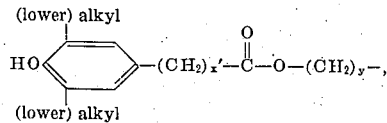

where $x'$ has a value from 1 to 6 and $y'$ has a value of 1 to 6.

2. The process of claim 1 wherein 0.5 percent to 8 percent by weight of the phenol compound is incorporated into the fiber, based on the weight of the antistatic compound.

3. The process of claim 1 additionally comprising dissolving in the extrudate prior to extrusion at least 0.10 percent by weight, based on the weight of the antistatic additive, of a sulfur compound of the formula:

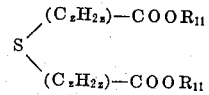

where $R_{11}$ is an alkyl radical containing 8 to 18 carbon atoms and z is 1 to 3.

4. The process of claim 3 wherein the weight ratio of the phenol compound to the sulfur compound is between 0.25 and 4.0.

5. The process of claim 4 wherein the phenol compound is selected from the group consisting of tetra[methylene 3-(3′,5′-di-tertiary-butyl-4′-hydroxyphenyl)propionate]methane and octadecyl-3-(3′,5′-di-tertiary butyl-4′-hydroxyphenyl)propionate.

6. An improved antistatic fiber consisting essentially of polyamide and about 1 percent to 12 percent by weight of an antistatic compound having a molecular weight about 1,500, said antistatic compound being the reaction product of a compound selected from the group consisting of compounds represented by the formulae:

(A) 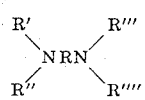

(B) 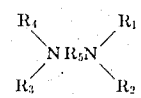

(C) 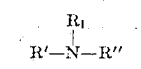

where
R is at least one of the alkylene difunctional radicals having 3 to 15 carbon atoms and a radical selected from

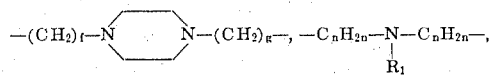

and
$-(C_rH_{2r}O)_s-(C_uH_{2u}O)_t-C_wH_{2w}-$; where R′, R″, R‴ R⁗ are

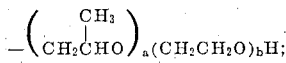

where
$R_1$, $R_2$, $R_3$ and $R_4$ are independently selected from R′ and monovalent hydrocarbon radicals having 1 to 20 carbon atoms derived from aliphatic, aromatic, cycloaliphatic, aromatic-aliphatic, heterocyclic hydrocarbons or $-(C_rH_{2r}O)_m(C_pH_{2p}O)_q-H$; where $R_5$ is ethylene radical, R or a divalent radical selected from:

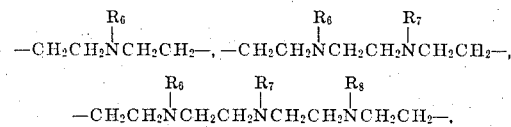

and

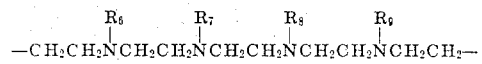

and
$R_6$, $R_7$, $R_8$, and $R_9$ are independently selected from $R_1$, $R_2$, $R_3$, $R_4$ or another monovalent hydrocarbon radical having 1 to 20 carbon atoms as defined for $R_1$, $R_2$, $R_3$ and $R_4$, provided that at least one of $R_1$, $R_2$, $R_3$, $R_4$, $R_5$, $R_6$, $R_7$, $R_8$ or $R_9$ is R′;

where n is 3 to 6, r and u are 2, 3, or 4; m, q are 0 to 100; m + q must be >5; w is 2, 3, or 4; p is 2 or 3; f, g, are 0 or 2 to 6; s and t are 0 or a whole number and s + t must be less than 100; a and b are whole numbers; with at least one compound selected from compounds which yield the following divalent radical

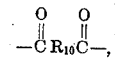

where
$R_{10}$ is a divalent radical having 1 to 20 carbon atoms derived from aliphatic, aromatic, cycloaliphatic, aromatic-aliphatic, or heterocyclic hydrocarbons; and at least 0.1 percent by weight, based on the weight of the antistatic compound, of a phenol compound selected from the group consisting of

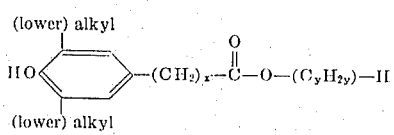

in which x has a value of from 1 to 6 and y has a value of from 6 to 30; and

in which A is

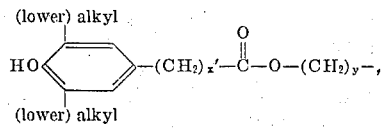

where x′ has a value from 1 to 6 and y′ has a value of 1 to 6.

7. The fiber of claim 6 wherein 0.5 percent to 8 percent by weight of the phenol compound is incorporated into the fiber based on the weight of the antistatic compound.

8. The fiber of claim 6 additionally consisting of at least 0.1 percent by weight, based on the weight of the antistatic additive, of a sulfur compound of the formula:

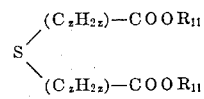

wherein $R_{11}$ is an alkyl radical containing 8 to 18 carbon atoms and z is 1 to 3.

9. The fiber of claim 8 wherein the weight ratio of the phenol compound to the sulfur compound is between 0.25 and 4.0.

10. The fiber of claim 9 wherein the phenol compound is selected from the group consisting of tetra[methylene 3-(3′,5′-di-tertiary-butyl-4′-hydroxyphenyl)propionate]methane and octadecyl-3-(3′,5′-di-tertiary butyl-4′-hydroxyphenyl)propionate.

* * * * *

UNITED STATES PATENT OFFICE
CERTIFICATE OF CORRECTION

Patent No. 3,859,380           Dated   January 7, 1975

Inventor(s)   Lamberto Crescentini and Rodney Lee Wells

It is certified that error appears in the above-identified patent and that said Letters Patent are hereby corrected as shown below:

Column 3, line 36, "fiberforming" should be --fiber-forming--.

Column 6, line 42, formula "$C(CH_3)_2$" should read --$C(CH_3)_3$--.

Column 7, line 63, "chainextended" should read --chain-extended--

Column 8, line 54, "butyl4'-" should read --butyl-4'- --.

Column 13, line 32, "hydroryphenyl" should read --hydroxyphenyl--

Column 16, line 25, "improvements" should read --improvement--.

Signed and sealed this 1st day of April 1975.

(SEAL)
Attest:

RUTH C. MASON
Attesting Officer

C. MARSHALL DANN
Commissioner of Patents
and Trademarks